J. J. MAXWELL.
HAMMOCK.
APPLICATION FILED OCT. 13, 1911.
1,026,524.
Patented May 14, 1912.
2 SHEETS—SHEET 2.
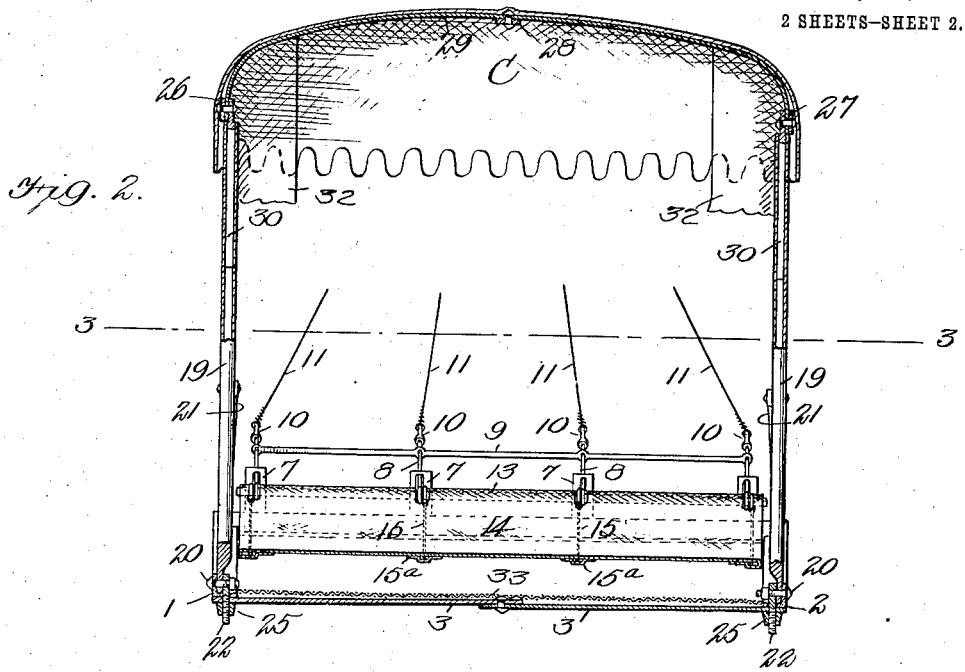
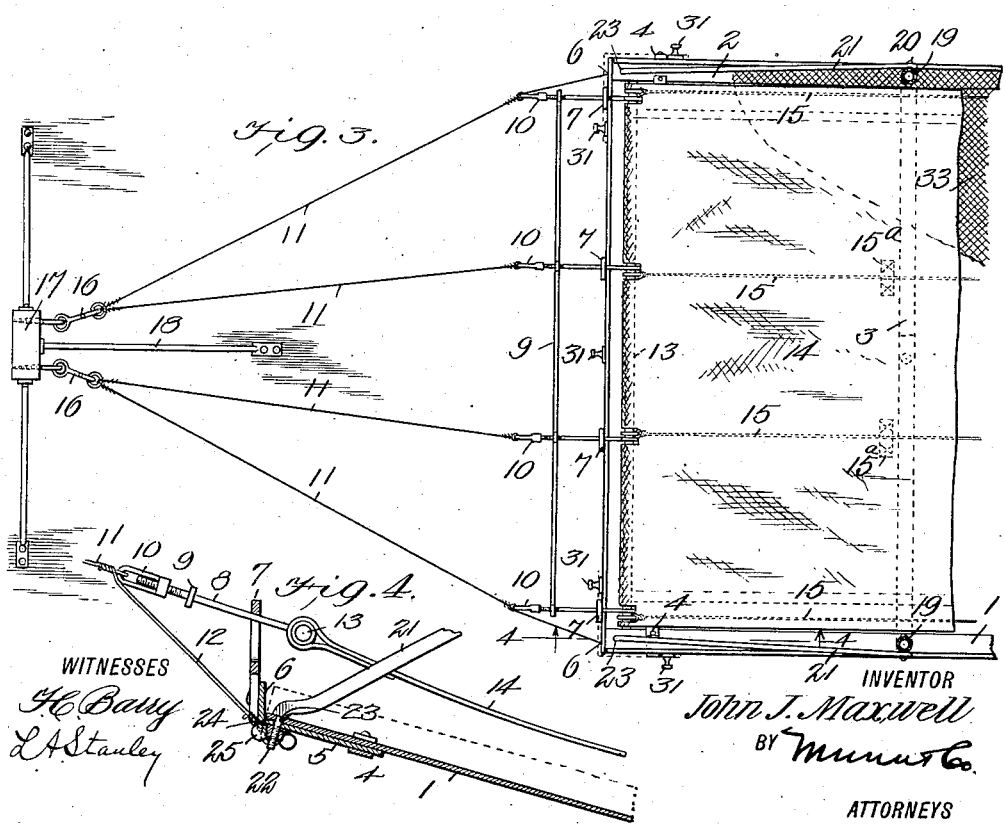
WITNESSES
H. C. Bailey
L. A. Stanley
INVENTOR
John J. Maxwell
BY Munn & Co.
ATTORNEYS

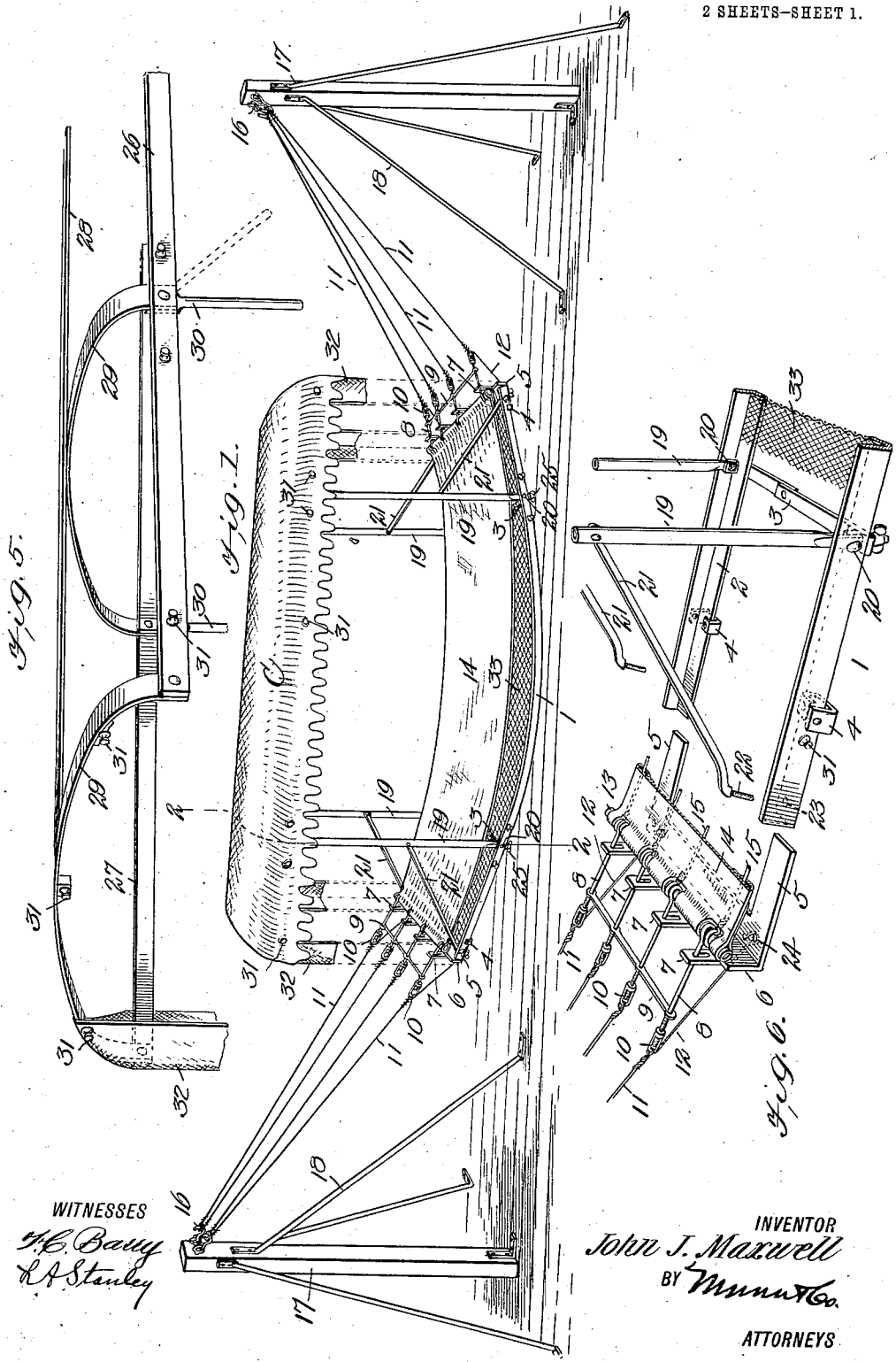

UNITED STATES PATENT OFFICE.

JOHN J. MAXWELL, OF WASHINGTON, DISTRICT OF COLUMBIA.

HAMMOCK.

1,026,524.  Specification of Letters Patent.  Patented May 14, 1912.

Application filed October 13, 1911. Serial No. 654,475.

*To all whom it may concern:*

Be it known that I, JOHN J. MAXWELL, a citizen of the United States, and a resident of Washington, in the District of Columbia, have made certain new and useful Improvements in Hammocks, of which the following is a specification.

My invention relates to improvements in hammocks, and it consists in the combinations, constructions and arrangements herein described and claimed.

The present invention is designed as an improvement on that disclosed in my prior Patent #909,102 of January 5, 1909, and the main object is to render the device more stable.

A further object of my invention is to facilitate the assemblage of the parts, and to permit the device to be taken apart for transportation or storage.

A further object of my invention is to provide a brace for the device so as to render it stronger, and at the same time to give the parts a relative movement, so as to prevent the straining or giving way of portions of the device.

My invention is illustrated in the accompanying drawings forming part of this application in which similar reference characters indicate like parts in the several views, and in which—

Figure 1 is a perspective view of a hammock constructed according to my invention, Fig. 2 is an enlarged section along the line 2—2 of Fig. 1, Fig. 3 is a section along the line 3—3 of Fig. 2, Fig. 4 is a section along the line 4—4 of Fig. 3, Fig. 5 is a perspective view of the cover support, and Fig. 6 is a detail perspective view showing the construction of the end portion of the main frame.

In carrying out my invention I provide a main frame consisting of the curved angle-irons 1 and 2, which form the side members of the frame, and which are joined by the hinged braces 3, such as that shown in Figs. 1, 2 and 3. Each of the side members 1 and 2 is provided near its ends with a socket 4 arranged to receive the lateral extensions 5 of the end member 6. The latter is provided with a series of slotted extensions 7, and arranged to pass through the slots are a series of bolts 8. The bolts 8 are spaced apart by means of a spreader bar 9, and each bolt is provided with a turnbuckle 10 to which is attached a suspending cord 11, as clearly shown in Fig. 6. An auxiliary suspension cord or cable 12 is provided at each end of the end member 6 which joins the main suspension cord 11, and is secured to the bottom part of the end member 6, as clearly shown in Fig. 6.

Arranged to pass through the eyes of the bolts 8 is a rod 13 to which the flexible suspension member 14 is secured. In this case I have shown this flexible suspension member as being made of canvas. In order to prevent the undue stretching of the canvas, I arrange the stiffening wires 15, which are also secured to the rod 13, and which run underneath the canvas suspension member from end to end of the main frame. In order to keep these wires in place I preferably sew loops 15$^a$ on the under side of the extension member 14 through which the wires pass, as shown in Fig. 3.

The cords 11 are secured to a pair of hooks 16 carried by the upright 17. In Fig. 1 I have shown the upright 17 as being mounted on the floor and being held in position by braces 18, but obviously the hooks 16 might be secured to any suitable stationary object such as a tree, the side of the house, or other convenient support.

It should be borne in mind that the purpose of the construction thus described is to afford means for the use of a cover frame which may be provided with a top as illustrated in Fig. 1, or which may be completely inclosed, the cover frame being practically unaffected by the movement of the suspension member so that the occupant may move about within the hammock without causing the cover frame to bend or break. The cover frame itself consists of four hollow uprights such as those shown at 19. These uprights are pivotally connected at 20 with the side members 1 and 2. Each upright is provided with a pivoted brace. such as that shown at 21, the lower free end of the brace being provided with a threaded bolt 22 arranged to pass through the registering openings 23 in the side member and the opening 24 in the end member 6.

The connection of the end member 6 with the side members 1 and 2 is best shown in Fig. 4. In this figure, it will be seen that the extension 5 of the end member 6 lies underneath the bottom of the side member 1, the end of the extension 5 fitting in the socket 4 carried by the member 1. The threaded bolt 22, at the end of the brace member 21, passes through the registering openings 23 and 24 (see Fig. 6) and is held in place by means of a thumb nut 25 (see Fig. 4). The other four uprights are provided with braces 21, which are fastened to the end members in precisely the same manner.

The top part of the cover frame consists of the longitudinal strips 26, 27 and 28 (see Fig. 5) connected by means of the curved bows 29. Arranged to register with the hollow supports 19 are the rods or pins, like that shown at 30. These are pivoted to the side members 26 and 27, and are adapted to be inserted in the open ends of the supports 19, the purpose of this construction being to permit a slight movement of the top with respect to the uprights 19.

The side members 1 and 2 of the main frame, the end members 6, the longitudinal members 26 and 27, and the end bows 29 are provided with buttons 31 to which a covering 32 (see Fig. 5) may be attached, thus forming side walls for the tent-like inclosure carried by the hammock.

From the foregoing description of the various parts of the device the operation thereof may be readily understood.

The device is designed, as stated, to be used either in camp for sleeping purposes, thereby taking the place of a tent, or it may be used on a lawn without the side walls in the manner shown in Fig. 1. When it is used as a tent I prefer to stretch wire netting 33 across the bottom of the main frame between the side members 1 and 2 to prevent the entrance of insects.

The operation of the device thus constructed is as follows: The suspension member 14, as may be seen from Fig. 1, is above the main frame, and when a person lies or sits upon the suspension member the strain comes on the bolts 8, and not upon the main frame, the sagging of the suspension member merely causing the bodily movement of the bolts 8 through the slots in the extensions 7. The frame however is suspended from the flexible members 11 by means of the flexible supports 12. The device may be taken apart very readily and packed in small compass. To do this the cover portion C is lifted off from the supports 19, the nuts 25 are taken off, and the braces 21 and the pivoted supports 19 may be folded into practical alinement with the side members 1 and 2. The end member 6 may then be pulled out and the side members 1 and 2 may be forced together, by bending the braces 3 at their pivotal point. When the parts are thus folded, as described, they can be tied together and the device will thus occupy comparatively little room.

The provision of the spreader 9, I regard as an important feature of this invention. Without it the bolts 8 have a tendency to bind in the slots in the extensions 7 but with the spreader the movement of all the bolts is not at an angle to the slots, but directly through them. The provision of the two hooks insures the stability of the device without preventing the hammock from swinging in the ordinary manner.

I claim:

1. The combination with a hammock, of a bottom frame therefor having a series of end slots, a series of bolts attached to said hammock and arranged to slide through said end slots, means for maintaining said bolts in parallel positions, and suspension means attached to said bolts.

2. The combination with a hammock, of a bottom frame therefor having a series of end slots, a series of bolts attached to said hammock and arranged to slide through said end slots, suspension means attached to said bolts, and a spreader bar for maintaining the bolts in parallel positions.

3. The combination with a hammock, of a bottom frame therefor having a series of end slots, a series of bolts attached to said hammock and arranged to slide through said end slots, flexible cords attached to said bolts, a spreader for maintaining the bolts in parallel positions, and auxiliary flexible members secured to said flexible cords and attached to the frame ends for supporting the latter.

4. The combination with a hammock, of a spreader rod at each end thereof, a series of eye bolts loosely connected with said spreader, a bottom frame provided with slotted ends, said bolts being arranged to extend through said slotted ends, a support, a flexible suspension cord attached to each bolt, an auxiliary spreader for maintaining the bolts in parallel positions, and auxiliary flexible members secured to certain of said flexible cords at one end and attached to the main frame at the other end for suspending the main frame.

5. The combination with a hammock member, of a frame therefor, said frame comprising a pair of side members, slotted end members detachably connected to said side members, a series of bolts adapted to slide through the slots in said end members and having connection with said hammock member, a cover frame secured to said main frame, and braces for said cover frame, said braces serving to secure the end portions of said main frame to the side portions.

JOHN J. MAXWELL.

Witnesses:
L. A. STANLEY,
SOLON C. KEMON.